P. WEBER.
ARTIFICIAL EYE.
APPLICATION FILED DEC. 6, 1916.
1,219,058.  Patented Mar. 13, 1917.
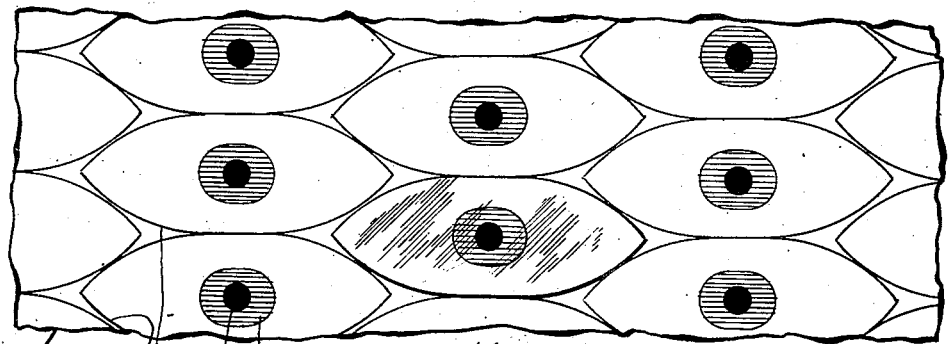
Fig. 1
Fig. 2
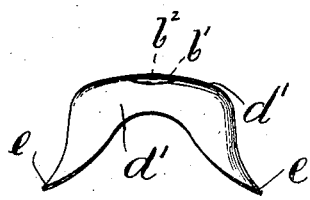
Fig. 3
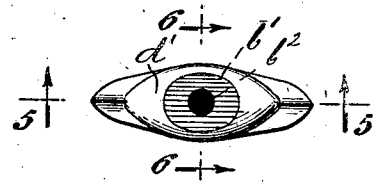
Fig. 4
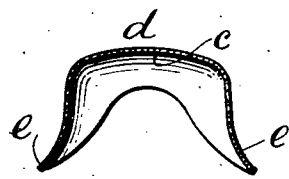
Fig. 5
Fig. 6
Inventor
Paul Weber
By his Attorney

UNITED STATES PATENT OFFICE.

PAUL WEBER, OF NEW YORK, N. Y.

ARTIFICIAL EYE.

1,219,058.  Specification of Letters Patent.  Patented Mar. 13, 1917.

Application filed December 6, 1916. Serial No. 135,333.

*To all whom it may concern:*

Be it known that I, PAUL WEBER, a subject of the German Emperor, residing at New York, in the county of New York and State of New York, have invented certain new and useful Improvements in Artificial Eyes, of which the following is a specification.

The hitherto used artificial glass eyes for dolls or living persons are found to be objectionable in many respects, thus for instance, because of their being easily breakable and expensive.

One object of this invention is to obviate the above-named drawbacks.

Another object is to provide an artificial eye which will allow of its being manufactured by machine, whereby the cost will be reduced to a minimum.

A further object is to enable the making of the artificial eyes more effective in expression than glass eyes.

With these and other objects in view my invention consists in the novel construction of artificial eyes and the method of making the same.

The invention is illustrated in the accompanying drawing, in which similar reference characters denote corresponding parts and in which Figures 1 and 2 illustrate in plan and side view the method of making the new article; Fig. 3 is a side view of the completed artificial eye; Fig. 4 is a top plan view thereof; Fig. 5 is a section on line 5—5 of Fig. 4; and Fig. 6 is a cross section on line 6—6 of Fig. 4.

According to my invention the artificial eyes are made of pliable and transparent material, such as for instance celluloid, which is formed into the shape of a hollow hat-like body $d$ having parts $e$ serving as retaining means.

The method of producing the eyes consists in that on a piece or sheet $a$ of material having the above-named characteristics, the contours and designs of a number of eyes are painted by hand, applied by pressure or otherwise. Thereupon the contours are cut or punched out and the cut out pieces $b$ pressed into the shape of a hollow body $d$ having a spherically curved top $d'$ substantially as shown in Figs. 3–6, the inner surface of which top bears the design $c$ previously applied to the sheet $a$. Owing to the transparency of the material the color of the eyeball, iris $b'$ and pupil $b^2$ will be visible through the glossy outer surface of the eye, whereby the expression of the latter is rendered very vivid. By the outwardly projecting parts $e$ the eye can be securely held in position within the hollow of the eyeball. The new eye has also the advantages of being light and durable.

What I claim and desire to secure by Letters Patent is:

1. An artificial eye made of pliable material in the from of a hollow body.

2. An artificial eye made of pliable and transparent material in form of a hollow body the inner surface of which bears the design of the eye which is visible through the outer surface of the material.

3. An artificial eye made of pliable and transparent material in form of a hollow body, the inner surface of which bears the design of the eye which is visible through the outer surface of the material and the edges of which body are bent to serve as retaining means for the eye.

4. A method of making artificial eyes consisting in applying the contour and design of an eye to the inner surface of a pliable and transparent sheet of material, then cutting out the contour and pressing the cut out piece into the shape of a hollow body so that the inner surface of said body will bear the design, and that projecting parts will be formed to serve as retaining means for the eye.

In testimony whereof I affix signature in presence of two witnesses.

PAUL WEBER.

Witnesses:
 FRED. J. GRIESMER,
 D. B. KLEIN.